United States Patent
Hsu et al.

(10) Patent No.: US 11,293,475 B2
(45) Date of Patent: Apr. 5, 2022

(54) SCREW

(71) Applicants: Kuo-Tai Hsu, Tainan (TW); Ming-Hao Hsu, Tainan (TW)

(72) Inventors: Kuo-Tai Hsu, Tainan (TW); Ming-Hao Hsu, Tainan (TW)

( * ) Notice: Subject to any disclaimer, the term of this patent is extended or adjusted under 35 U.S.C. 154(b) by 188 days.

(21) Appl. No.: 16/745,502

(22) Filed: Jan. 17, 2020

(65) Prior Publication Data

US 2021/0222723 A1 Jul. 22, 2021

(51) Int. Cl.
 *F16B 35/06* (2006.01)
 *F16B 25/00* (2006.01)

(52) U.S. Cl.
 CPC ........ *F16B 35/065* (2013.01); *F16B 25/0047* (2013.01)

(58) Field of Classification Search
 CPC ..... F16B 35/064; F16B 35/06; F16B 25/0047
 USPC ........................................................ 411/399
 See application file for complete search history.

(56) References Cited

U.S. PATENT DOCUMENTS

| | | | | |
|---|---|---|---|---|
| 3,903,784 A | * | 9/1975 | Dekker | F16B 35/065 411/399 |
| 5,683,217 A | * | 11/1997 | Walther | F16B 35/06 411/399 |
| 5,772,376 A | * | 6/1998 | Konig | F16B 35/065 411/188 |
| 6,558,097 B2 | * | 5/2003 | Mallet | F16B 35/065 411/399 |
| 6,676,353 B1 | * | 1/2004 | Haytayan | F16B 23/003 206/346 |
| 8,348,575 B2 | * | 1/2013 | Walther | F16B 25/0052 411/399 |
| 8,770,904 B2 | * | 7/2014 | Henriksen, Jr. | F16B 25/0031 411/399 |
| 9,297,402 B2 | * | 3/2016 | Hughes | F16B 35/065 |
| 10,480,562 B2 | * | 11/2019 | Shih | F16B 25/0015 |
| 2009/0123253 A1 | * | 5/2009 | Hettich | F16B 35/065 411/399 |
| 2014/0178149 A1 | * | 6/2014 | Su | F16B 35/065 411/399 |
| 2015/0063947 A1 | * | 3/2015 | Huang | F16B 35/065 411/393 |
| 2018/0080491 A1 | * | 3/2018 | Scheerer | F16B 25/103 |

\* cited by examiner

*Primary Examiner* — Gary W Estremsky
(74) *Attorney, Agent, or Firm* — Karin L. Williams; Alan D. Kamrath; Mayer & Williams PC

(57) ABSTRACT

A screw includes a head and a shank extending from the head and defining a longitudinal axis. A thread is provided on the shank. The head includes a top portion and a cone portion located between the top portion and the shank. A plurality of recesses is provided in a peripheral surface of the cone portion and spaced in a circumferential direction of the cone portion. Each recess includes first and second side edges opposite to each other in the circumferential direction and an upper edge connecting the first and second side edges. The first side edge features a maximum recess depth greater than a maximum recess depth of the second side edge. The top edge extending in the circumferential direction of the cone portion is partially arranged between the top portion and the first side edge of an adjacent recess in the longitudinal axis direction.

10 Claims, 8 Drawing Sheets

SCREW

BACKGROUND OF THE INVENTION

1. Field of the Invention

The present invention relates to a screw and, more particularly, to a head structure of a screw.

2. Description of the Related Art

A self-tapping screw head structure as disclosed in the U.S. Pat. No. 10,480,562 includes a screw head, a rod connected to the screw head, a cone connected to one end of the rod away from the screw head, and a thread extending from the cone to the rod. A direction of the thread surrounding the cone and the rod determines a tapping direction surrounding the screw head and forming a circumferential path. The screw head includes a top portion, a first neck portion connected to the top portion and having a circumference gradually decreasing towards away from the top portion, a plurality of recesses recessing from a surface of the first neck portion and having recess depths gradually decreasing along the tapping direction, and a second neck portion connected to the first neck portion and having a circumference gradually decreasing towards away from the first neck portion. Each of the plurality of recesses includes a crumb guiding end located at a position with a minimum recess depth, a cutting end away from the crumb guiding end and having a maximum recess depth, a first accommodating groove located between the cutting end and the crumb guiding end and adjacent to the top portion, and a second accommodating groove located between the cutting end and the crumb guiding end, adjacent to the first accommodating groove and away from the top portion. The recess depth of the first accommodating groove is greater than that of the second accommodating groove. During the tapping process of the self-tapping screw head structure, the plurality of recesses are capable of accommodating and discharging wood crumbs and thus eliminating obstruction against the tapping and fastening process. After the tapping and fastening process is completed, wood crumbs are accommodated in the accommodating grooves, increasing the binding force with object and achieving secure fastening.

However, the cutting force of the screw head structure which is being driven into a workpiece is not strong enough and unsatisfactory. Specifically, because the total length of all the cutting ends of the screw head structure extends a partial circumferential surface of the screw head and there is only one cutting end at the screw head structure in the longitudinal axis direction, the cutting ends exert a weak cutting force on the workpiece. Accordingly, a strong torque should be applied on the screw head structure which is being driven into the workpiece, and a speed to drive the screw keeps low. Moreover, remnant wood crumbs probably squeezed outward from the drilled hole remain on the workpiece surface and make the surface uneven after the screw head is driven into the workpiece.

BRIEF SUMMARY OF THE INVENTION

It is an objective of the present invention to provide a screw including a head in which a plurality of recesses spaced from one another is designed. Each recess has a function of cutting a workpiece in both longitudinal and radial directions, and the waste generated from cutting can be accommodated in the plurality of recesses, achieving excellent countersinking effect and locking stability.

To achieve this and other objectives, a screw of the present invention includes a head and a shank extending from the head and defining a longitudinal axis. A thread is provided on the shank. The head includes a top portion and a first cone portion located between the top portion and the shank and having a peripheral surface. The screw is characterized in that the peripheral surface of the first cone portion is provided a plurality of recesses spaced from one another in a circumferential direction of the first cone portion. Each of the plurality of recesses includes first and second side edges opposite to each other in the circumferential direction and a top edge linking the first and second side edges and adjacent to the top portion. The first side edge has first recess depths and the second side edge has second recess depths. A maximum second recess depth of the second side edge is less than a maximum first recess depth of the first side edge. The top edge extends in the circumferential direction of the first cone portion and is partially arranged between the top portion and the first side edge of an adjacent recess along the longitudinal axis.

In an embodiment, the plurality of recesses define a total extension angle in the circumferential direction which surrounds the whole peripheral surface of the first cone portion, and some portions of two adjacent recesses overlap each other along the longitudinal axis.

In an embodiment, the first side edge has a bottom end and a top end linking the top edge, the first side edge extends upward from the bottom end to the top end in a slantwise direction, and an upward slantwise direction of the first side edge is contrary to an upward slantwise direction of the thread.

In an embodiment, the first recess depths of the first side edge at the bottom end and the top end are identical to each other.

In an embodiment, the first recess depths of the first side edge are gradually reduced from the top end to the bottom end.

In an embodiment, the top edge has third recess depths which are gradually reduced from the first side edge to the second side edge.

In an embodiment, the peripheral surface of the first cone portion is provided with at least three recesses spaced in the circumferential direction. In a preferred embodiment, the peripheral surface of the first cone portion is provided with three recesses spaced in the circumferential direction, and an extension angle of each recess in the circumferential direction is between 120 and 170 degrees.

In an embodiment, the peripheral surface of the first cone portion has roughly triangular cross sections.

In an embodiment, the head further includes a second cone portion between the first cone portion and the shank, and the second cone portion has a cone angle different from a cone angle of the first cone portion.

The present invention will become clearer in light of the following detailed description of illustrative embodiments of this invention described in connection with the drawings.

DETAILED DESCRIPTION OF THE INVENTION

Figure 1:
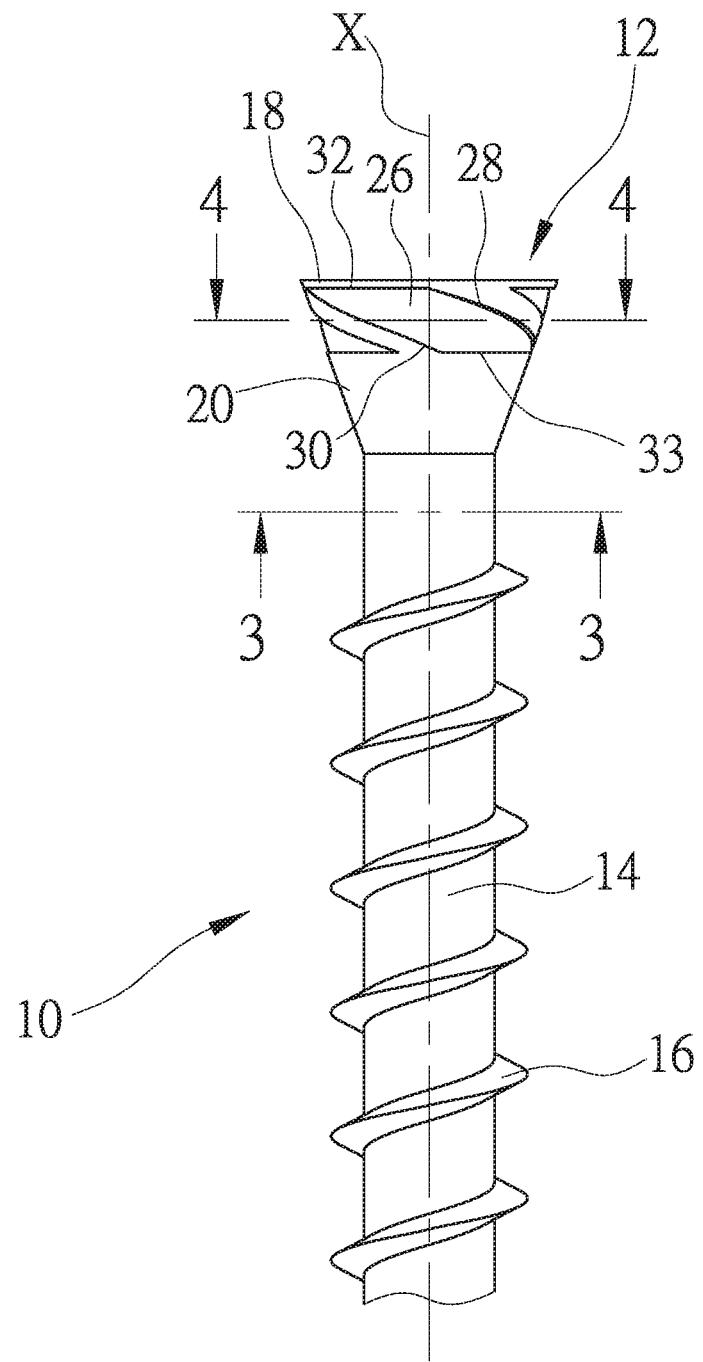
FIG. 1 is a plane view of a screw according to a first embodiment of the present invention.
Figure 2:
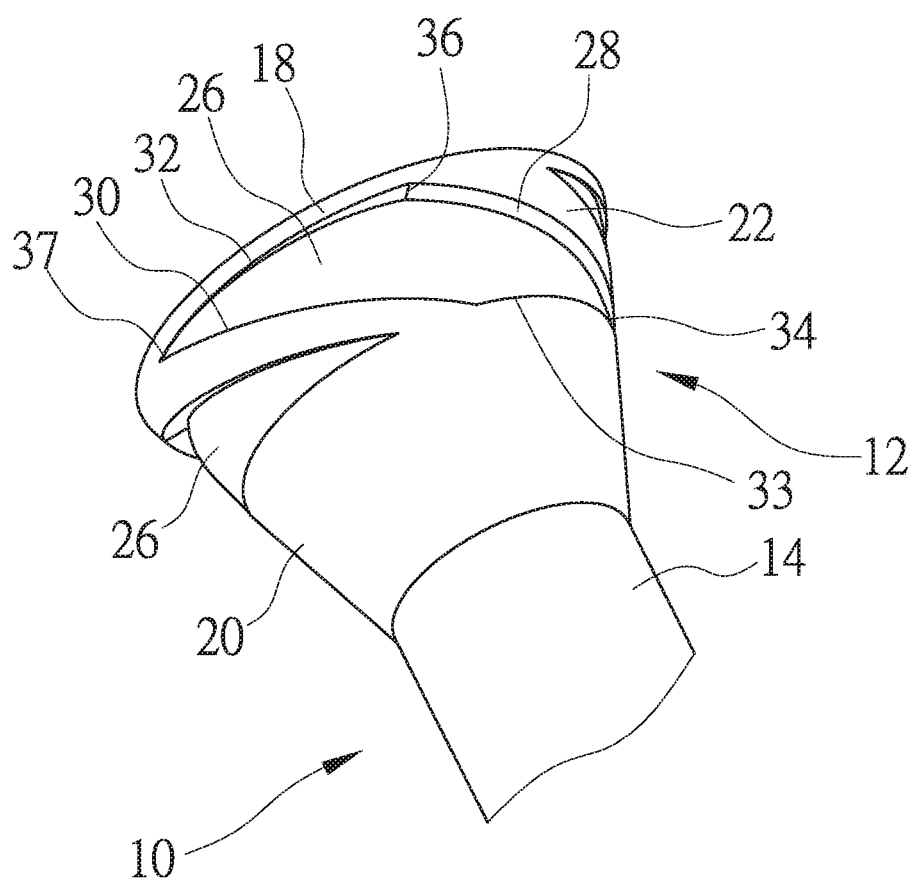
FIG. 2 is an enlarged perspective view of a head for the screw in FIG. 1.
Figure 3:
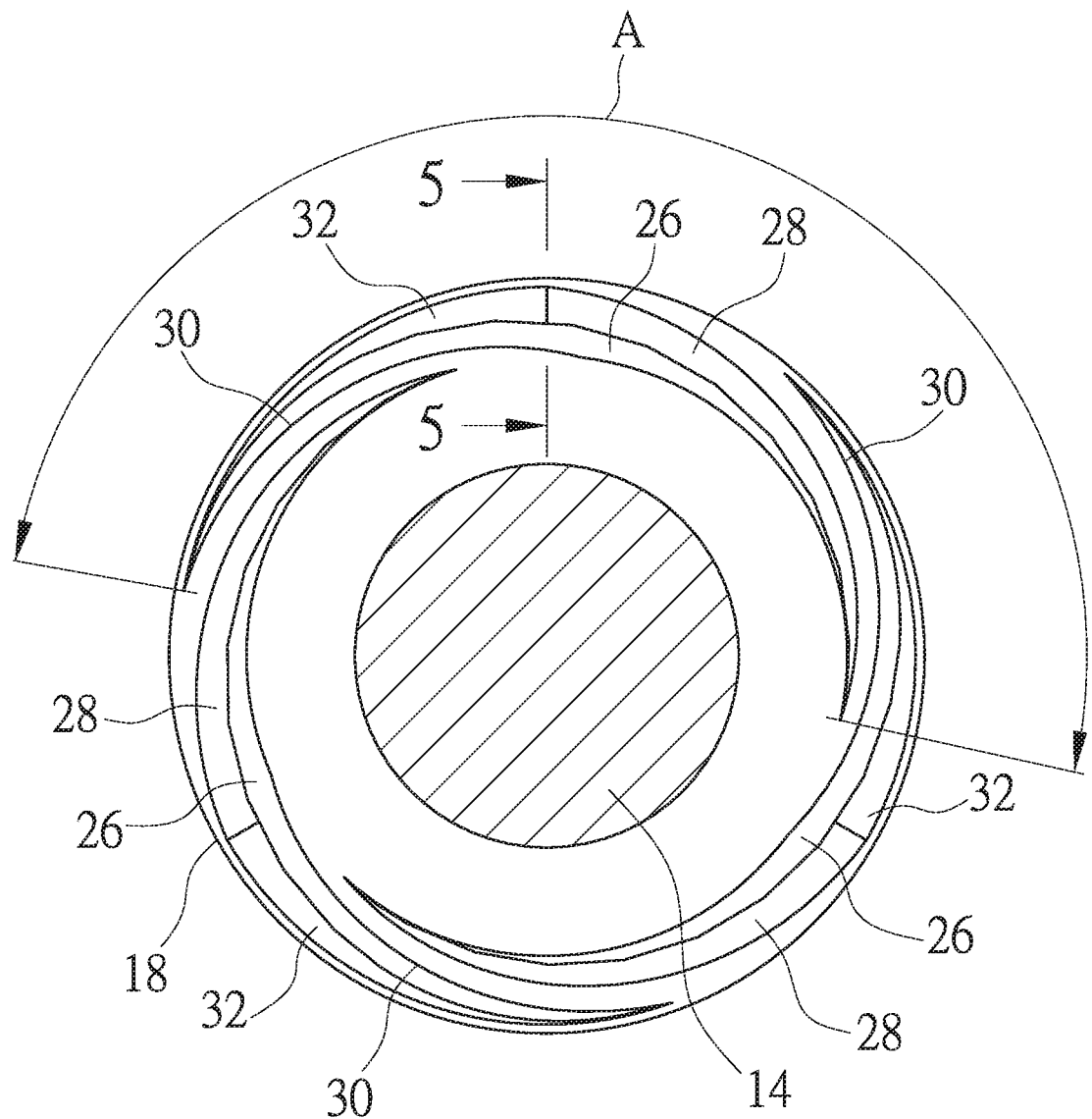
FIG. 3 is a sectional view taken along line 3-3 of FIG. 1.
Figure 4:
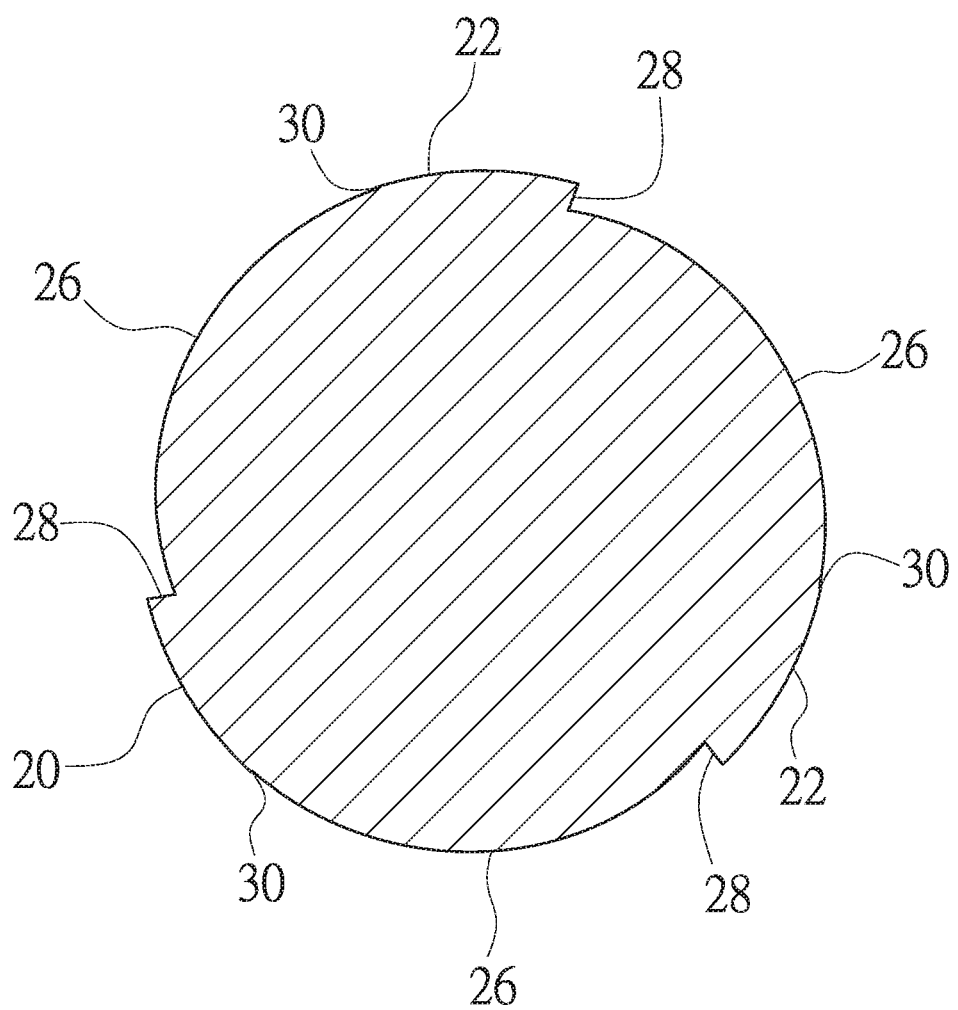
FIG. 4 is a sectional view taken along line 4-4 of FIG. 1.
Figure 5:
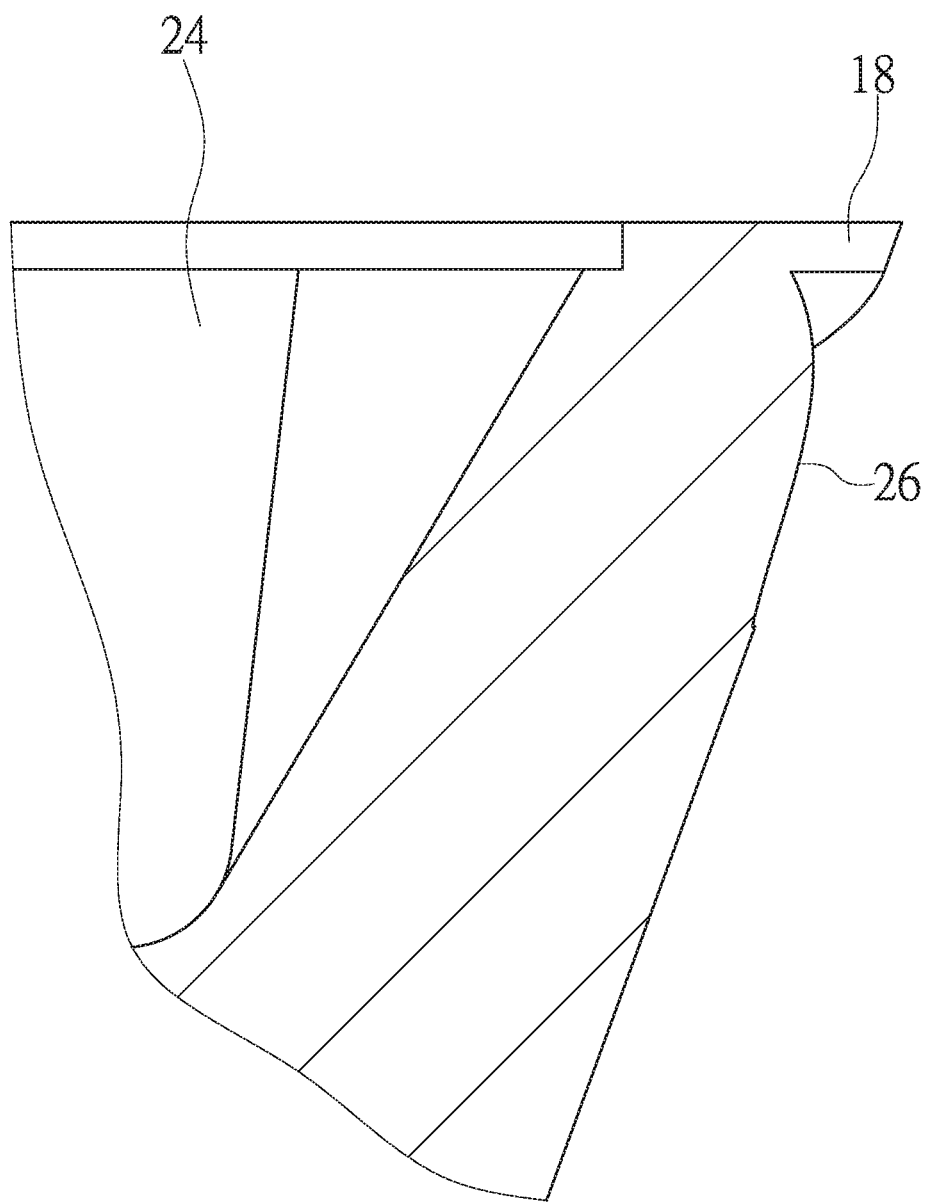
FIG. 5 is a sectional view taken along line 5-5 of FIG. 3.

A screw 10 according to a first embodiment of the present invention is shown in FIGS. 1 through 6 of the drawings and includes a head 12 and a shank 14 extending from the head 12 and defining a longitudinal axis X. In this embodiment, the shank 14 has a circular cross section and is provided with at least one thread 16 which is a right-hand thread slantwise upward extending from left to right. The shank 14 is provided with a screw-in portion (not shown in figures) at the tail end. The head 12 includes a top portion 18 and a cone portion 20 between the top portion 18 and the shank 14. In this embodiment, the cone portion 20 has a peripheral surface 22 with a single cone angle. In a feasible embodiment, the head 12 includes two cone portions with two distinct cone angles. The peripheral surface 22 has an outer diameter tapering from the top portion 18 to the shank 14, and the top portion 18 has an outer diameter greater than the shank 14. A socket 24 is disposed in an upper surface of the head 22 for a screwdriver (not shown) to insert into.

The screw 10 of the present invention is characteristic of the peripheral surface 22 of the cone portion 20 provided with a plurality of recesses 26 which are spaced from one another in a circumferential direction of the cone portion 20. In this embodiment, the peripheral surface 22 features a circular cross section, and the cone portion 20 is provided with three recesses 26 arranged circumferentially and spaced from one another based on a certain angle. Each recess 26 displays a polygon in shape (for example, quadrilateral or triangle). In this embodiment, each recess 26 designed as a quadrilateral includes first and second side edges 28, 30 opposite to each other in the circumferential direction, a top edge 32 linking the first and second side edges 28, 30 and adjacent to the top portion 18, and a bottom edge 33 linking the first and second side edges 28, 30 and staying away from the top portion 18. The first side edge 28 has a bottom end 34 and a top end 36 linking the top edge 32 and forming a first turning angle. The first side edge 28 has first recess depths and forms a lateral cutting edge for cutting in the radial direction. The second side edge 30 has second recess depths and forms a guiding edge. A maximum second recess depth is less than a maximum first recess depth of the first side edge 28. The top edge 32 with third recess depths forms a top cutting edge for cutting in the longitudinal direction. In this embodiment, the third recess depths of the top edge 32 are gradually reduced from the first side edge 28 to the second side edge 30. The recess depths of the first side edge 28 at the bottom end 34 and the top end 36 may be different from each other, for example, the recess depths of the first side edge 28 tapering from the top end 36 to the bottom end 34. Alternatively, the recess depths of the first side edge 28 at the bottom end 34 and the top end 36 can be identical to each other. Moreover, the first side edge 28 extends upward from the bottom end 34 to the top end 36 in either a slantwise direction or a curve, and the upward slantwise direction of the first side edge 28 is contrary to an upward slantwise direction of the thread 16. The length of the first side edge 28 extending along the longitudinal axis X is changeable based on material of a workpiece. In this embodiment, the length is about 50% of the length of the cone portion 20 along the longitudinal axis X, and the top end 36 of the first side edge 28 is adjacent to the top portion 18. In a feasible embodiment, each recess 26 is designed as a triangle, wherein the bottom ends of the first and second side edges 28 and 30 are merged into one point where there is no existence of the bottom edge 33.

The top edge 32 extends in the circumferential direction of the cone portion 20 and has a second turning angle 37 connected to the second side edge 30. The second turning angle 37 is located between the top portion 18 and the first side edge 28 of an adjacent recess 26 along the longitudinal axis X. That is, a segment of the top edge 32 connecting to the second side edge 30 of each recess 26 is situated above the first side edge 28 of an adjacent recess 26 in the direction of the longitudinal axis X. Accordingly, the cone portion 20 partially includes two cutting edges (a lateral cutting edge formed by the first side edge 28 of a recess 26 and a top cutting edge formed by the top edge 32 of an adjacent recess 26) along the longitudinal axis X. In the embodiment, the extension angle A of each recess 26 in the circumferential direction of the cone portion 20 is greater than 120 degrees (see FIG. 3) and between 120 and 170 degrees preferably, such that the plurality of recesses 26 form all cutting edges extending and encircling the whole peripheral surface 22 of the cone portion 20, and some portions of two adjacent recesses 26 overlap each other along the longitudinal axis X.

Figure 6:
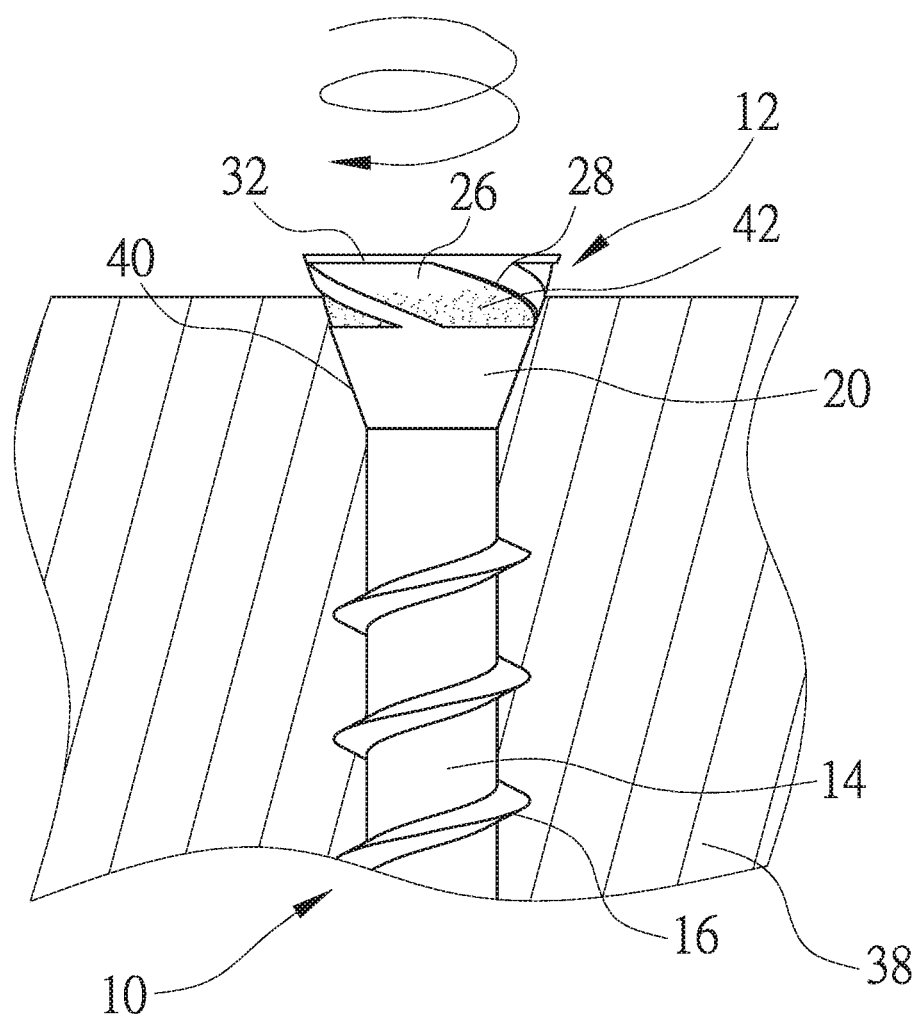
FIG. 6 is a schematic view illustrating the head of the screw in FIG. 1 driven into a workpiece.

In practice, as shown in FIG. 6, the screw 10 is inserted into a workpiece 38 such as a plank based on the screw-in portion (not shown in FIG. 6) of the shank 14 as an anchor point and rotated by a tool on the head 12, and the shank 14 is driven into the workpiece 38 in which a hole 40 has been drilled by the thread 16. Next, with a hole wall of the hole 40 cut in the radial direction by the first side edge 28 of one of the recesses 26 in the peripheral surface 22, the hole 40 in the workpiece 38 in which the head 12 is screwed is enlarged. Subsequently, the upper cutting edge which is formed by the top edge 32 of an adjacent recess 26 above the first side edge 28 will longitudinally cut the workpiece 38 in the axial direction. Arranged along the longitudinal axis X and adjacent to each other, one first side edge 28 and one top edge 32 of two adjacent recesses 26 are effective in repeated cutting in more than one direction. Moreover, in the plurality of recesses 26, the first side edges 28 and the top edges 32, all of which extend and encircle the whole peripheral surface 22 of the head 12, optimize a countersunk head for stable fastening. Additionally, remnant chips generated in the enlarged hole 40 are accumulated in recesses 26, and the remnant chips cut by the first side edge 28 of one recess 26 are squeezed downward by the top edge 32 of an adjacent recess 26 above the first side edge 28 and not exposed to ambient environment of the drilled hole for good flatness of the workpiece.

Figure 7:
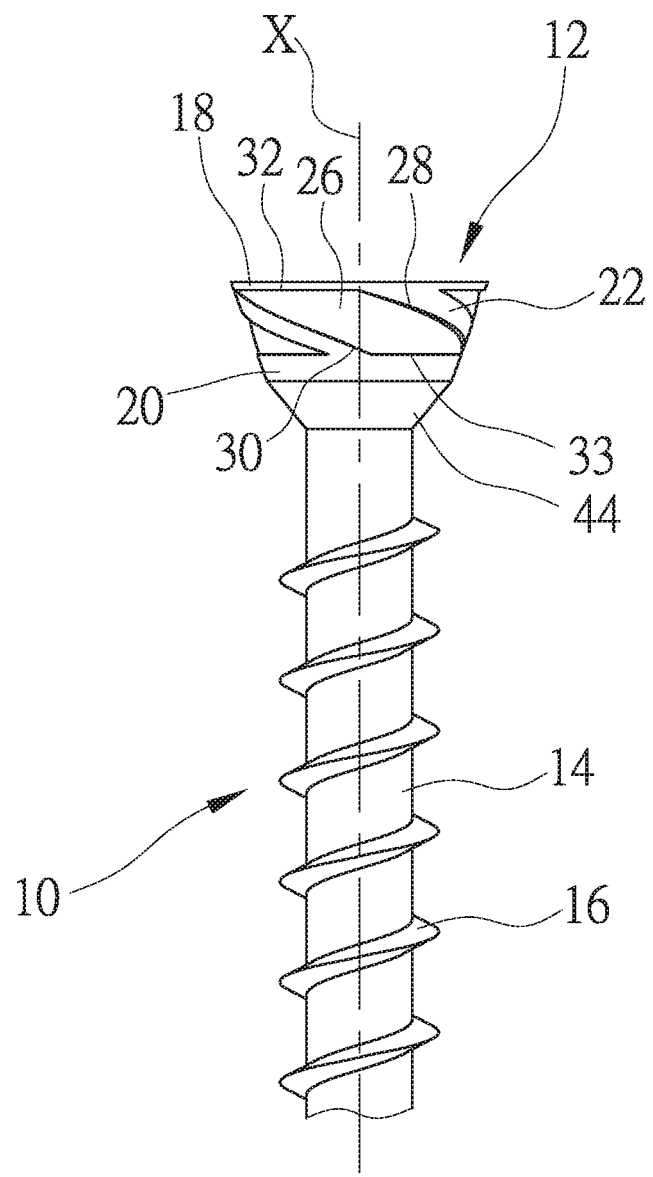
FIG. 7 is a plane view of a screw according to a second embodiment of the present invention.

FIG. 7 shows a screw 10 according to a second embodiment of the present invention modified from the first embodiment. In this embodiment, the head 12 further includes another cone portion 44 between the cone portion 20 and the shank 14. The cone portion 44 features a cone angle different from a cone angle of the cone portion 20 for better recess depths formed by the first side edge 28 and the top edge 32 on the cone portion 20. In a feasible embodiment, the plurality of recesses 26 can also be deployed on the cone portion 44.

Figure 8:
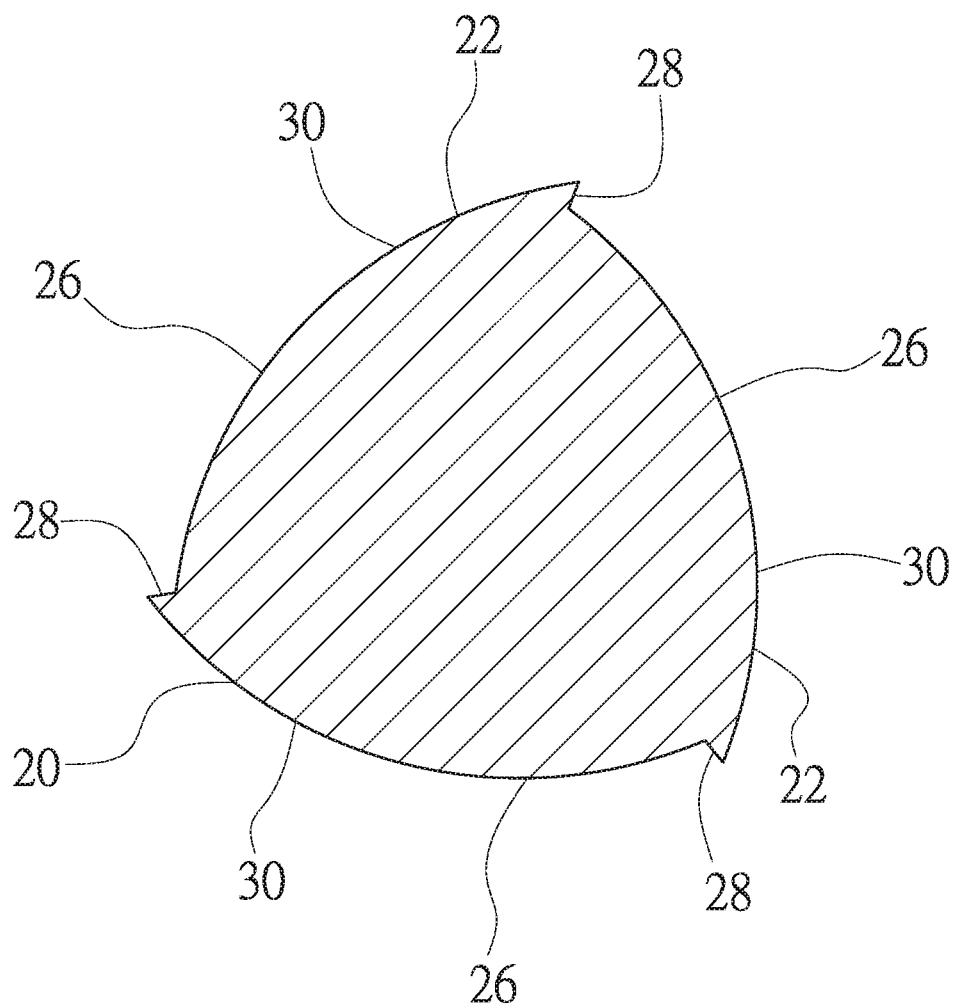
FIG. 8 is a sectional view similar to FIG. 4, illustrating a peripheral surface of a cone portion of the head of the screw in another embodiment.

FIG. 8 illustrates the peripheral surface 22 of the cone portion 20 of the present invention is provided with three spaced recesses 26 circumferentially and features roughly triangular cross sections so as to improve the hole expansion and chip stirring function of the cone portion 20. In FIG. 8, the second side edge 30 is characteristic of no development of recess depths and overlaps the peripheral surface 22. In a feasible embodiment, the peripheral surface 22 is provided with more than three recesses 26 spaced from one another in the circumferential direction of the cone portion 20 and the characteristic of the cross section of the peripheral surface 22 is with a shape matching the number of recesses, for example, an approximately quadrilateral cross section matching four recesses or an approximately pentagon cross section matching five recesses. In the case of four recesses 26 arranged on the peripheral surface 22 of the cone portion 20, each recess 26 is characteristic of an extension angle greater than 90 degrees (for example, between 90 and 120 degrees) in the circumferential direction of the cone portion 20 such that a partial top edge 32 of each recess 26 along the longitudinal axis X is situated between the top portion 18 and the first side edge 28 of an adjacent recess 26.

The scope of the invention is to be indicated by the appended claims, rather than by the foregoing description, and all changes which come within the meaning and range of equivalency of the claims are intended to be embraced therein.

The invention claimed is:

1. A screw comprising a head and a shank extending from the head and defining a longitudinal axis, with a thread provided on the shank, with the head including a top portion and a first cone portion located between the top portion and the shank and having a peripheral surface, wherein the screw is characterized in that the peripheral surface of the first cone portion is provided with a plurality of recesses spaced from one another in a circumferential direction of the first cone portion, with each of the plurality of recesses including first and second side edges opposite to each other in the circumferential direction and a top edge linking the first and second side edges and adjacent to the top portion, with the first side edge having first recess depths and the second side edge having second recess depths, with a maximum second recess depth being less than a maximum first recess depth of the first side edge, wherein the top edge extends in the circumferential direction of the first cone portion and a portion of the top edge is arranged between the top portion and the first side edge of an adjacent recess in the direction of the longitudinal axis, wherein the peripheral surface of the first cone portion is provided with at least three recesses spaced in the circumferential direction, and an extension angle of each recess in the circumferential direction is between 120 and 170 degrees.

2. The screw according to claim 1, wherein the plurality of recesses define a total extension angle in the circumferential direction which surrounds the whole peripheral surface of the first cone portion, and some portions of two adjacent recesses overlap each other along the longitudinal axis.

3. The screw according to claim 1, wherein the first side edge has a bottom top end that is joined to the top edge, and a bottom end, with the first side edge extending upward from its bottom end to its top end in a slantwise direction, with an upward slantwise direction of the first side edge being contrary to an upward slantwise direction of the thread.

4. The screw according to claim 3, wherein the first recess depths of the first side edge at the bottom end and the top end are identical to each other.

5. The screw according to claim 3, wherein the first recess depths of the first side edge are gradually reduced from the top end to the bottom end.

6. The screw according to claim 1, wherein the top edge has third recess depths which are gradually reduced from the first side edge to the second side edge.

7. The screw according to claim 1, wherein the peripheral surface of the first cone portion has roughly triangular cross sections.

8. The screw according to claim 1, wherein the head further includes a second cone portion between the first cone portion and the shank, and the second cone portion has a cone angle different from a cone angle of the first cone portion.

9. The screw according to claim 1, wherein the peripheral surface of the first cone portion is provided with three recesses spaced in the circumferential direction, and the peripheral surface of the first cone portion has roughly triangular cross sections.

10. The screw according to claim 1, wherein the peripheral surface of the first cone portion is provided with four recesses spaced in the circumferential direction, and the peripheral surface of the first cone portion has roughly quadrilateral cross sections.

* * * * *